Feb. 11, 1969
T. L. ETTER
3,427,478
RANDOM OUTPUT CONTROL CIRCUIT
Filed Feb. 9, 1966
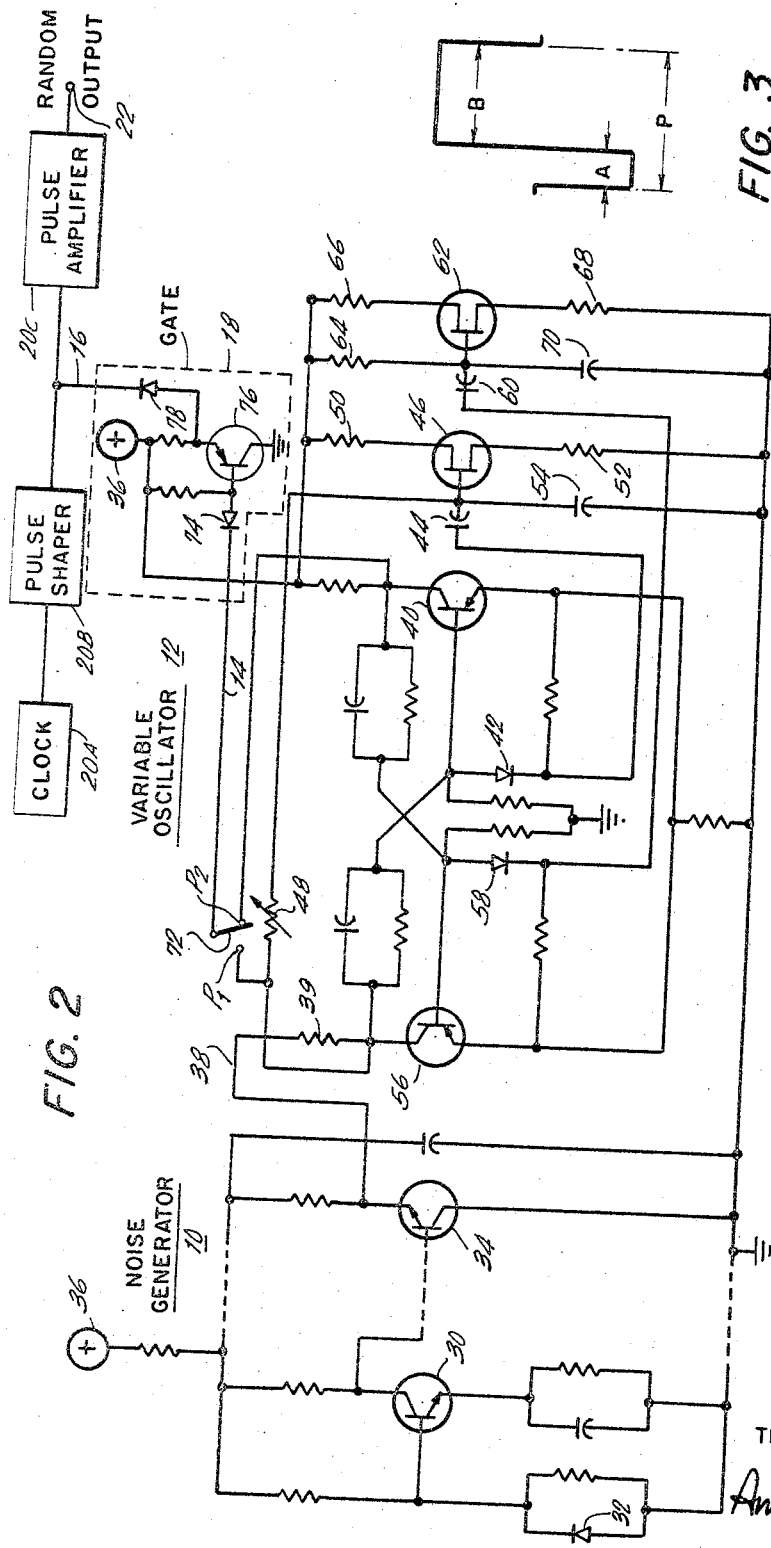
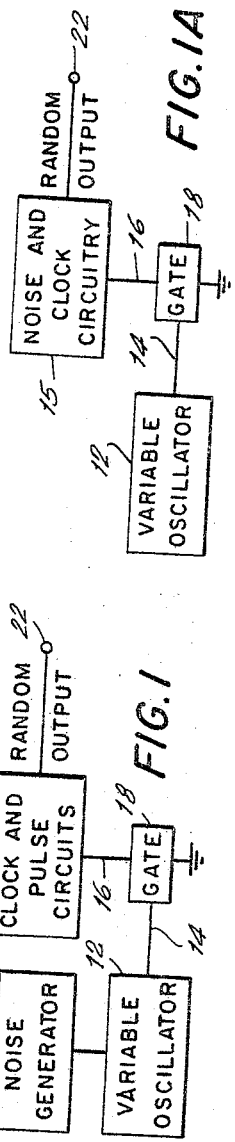
INVENTOR.
THOMAS L. ETTER
ATTORNEYS United States Patent Office 3,427,478
Patented Feb. 11, 1969

3,427,478
RANDOM OUTPUT CONTROL CIRCUIT
Thomas L. Etter, Suffern, N.Y., assignor to Foundation for Advancement of the Psychiatric Sciences, Inc., New York, N.Y., a corporation of New York
Filed Feb. 9, 1966, Ser. No. 526,163
U.S. Cl. 307—271                                              5 Claims
Int. Cl. H03k 3/82

ABSTRACT OF THE DISCLOSURE

A circuit for insuring the provision of randomly spaced pulses. A noise generator is utilized to vary the frequency of a square wave oscillator, the output of which is used to open and close a gate sequentially upon the occurrence of alternate half-cycles of the oscillator. The frequency of the output is varied randomly by a component of the voltage signal supplied by the noise generator.

---

This invention relates to a pulse-producing circuitry, and more particularly, to such circuitry for producing completely random pulse signals from a gate controlled by an oscillator.

The field of experimental testing has, in recent years, become one of intense activity for many researchers. This has been due in part to a recognition of the need for properly organized statistical data as a basis for valid test results and conclusions. Among the test conditions which have been studied increasingly, one of the most meaningful has been the responses of subjects and equipment to randomly generated stimuli. It is generally thought that in certain areas, the absence of a regular periodic input can enhance the validity of test results.

Moreover, with the advent of new experimental techniques, devices of all types have been designed or adapted for new uses. And modern instrumentation has been introduced into fields of study which has not until recently been thought appropriate for such equipment. To cite just one example by way of illustration, the field of psychological and psychiatric testing has started to utilize high-speed electronic circuits to good advantage.

Specifically, one of the areas in which psychologists are interested in gaining greater insight is the phenomenon of extrasensory perception (ESP). Experimental research on ESP is generally achieved using, for example, a human subject whose responses to various stimuli are studied. A subject who is thought to possess unusual ESP characteristics is often tested by noting his ability to select one of a group of objects, such as playing cards, which he cannot see. Or, the subject's responses to stimuli generated out of his presence are recorded; the time correlation between the distant stimuli and the subject's responses would then be investigated, with a higher correlation representing more of an indication of ESP ability. In this latter situation, one requirement can be the generation of randomly spaced signals to provide periodic test inputs in a location separated from the subject.

With these and other related testing conditions being required, prior art "random generators" have generally not been adequate for this purpose. That is, the prior art circuitry has not always insured the randomness of the generated stimuli, or if such randomness was provided, the circuitry was often too complex to warrant its use for small-scale testing projects. Furthermore, some of the prior art circuitry was found not to be readily adaptable to different testing situations.

One illustrative embodiment of this invention which obviates one or more of the aforesaid difficulties involves a control signal generated by a noise generator. This randomly varying signal is arranged to control the frequency of an oscillator which may be of the square wave flip-flop type. The oscillator output is fed to a control gate which has as its other input a periodic pulse train from, for example, a clock pulse generator. (An alternate approach could be to combine the noise generator and the clock pulse generator to achieve similar results.)

When the oscillator is in one of its two phases, the gate will thereby be controlled to be immune to the periodic signals from the clock source. In this situation, the signals pass directly from the clock source and its associated circuitry to an output terminal. On the other hand, when the oscillator is in its other phase, the gate is activated to divert or shunt the periodic signals occurring at that instant to a common ground, thereby preventing any signal from reaching the output terminal. Since the oscillator's frequency is varied at a completely random rate by the noise generator, the gate in turn is either on or off on a random basis as well. Therefore, there is no regularity to the presence of signals at the random output terminal and the desired random control has been achieved.

Means are included within the oscillator circuit to vary the range over which the oscillator's frequency may be controlled by the noise generator. Moreover, assuming that the clock pulses are of relatively short duration compared to the duration of either phase of the oscillator output, and considering a sufficiently large number of cycles, a definite probability relationship can be established for the random output. Thus, the probability that a clock pulse will be permitted to bypass the gate and proceed to the random output terminal can be a function of the ratio of one oscillator phase to the overall oscillator cycle. Under these conditions, should the "passing" oscillator phase be one-half of the duration of the "shunting" phase, then the probability that a given instantaneous clock pulse will reach the random output terminal is the ratio of the passing to the sum of the passing and shunting phases, or 0.333. Since this ratio is adapted to be varied, it is seen that the output probability of the circuit can be appropriately controlled.

It is therefore a feature of this invention that the frequency of an oscillator is varied randomly by a noise generator output to provide a variable ratio phase control signal to a gate circuit.

It is another feature of this invention that a gate circuit is randomly controlled either to shunt an input clock signal away from an output terminal or else to allow a clock signal to pass to an output terminal.

It is a further feature of this invention that the probability that a clock pulse signal will bypass a gate circuit is controlled by the ratio of one oscillator phase to a two-phase oscillator cycle, which ratio is in turn controlled by selected oscillator circuit elements.

The above brief description, as well as further objects, features and advantages of the present invention, will be more fully appreciated by reference to the following detailed description of a presently preferred, but nonetheless illustrative embodiment demonstrating objects and features of the invention, when taken in conjunction with the accompanying drawing, wherein:

FIG. 1 is a block diagram of a random control circuit;

FIG. 1A is a block diagram of an alternate embodiment of a random control circuit;

FIG. 2 is an illustrative detailed schematic diagram of such a circuit; and

FIG. 3 is a graphical representation of a typical oscillator output wave form which may be utilized by the circuit.

Referring briefly to the block diagram disclosure of FIG. 1, there is illustrated in block form a noise generator 10 the output of which is coupled to a variable oscillator 12. The controlling gate 18 has two inputs; the "gating input" over lead 14 from the oscillator 12, and the "pulse input" over the lead 16 from the clock and pulse circuits block 20.

The relative time durations of the output phases of the variable oscillator 12 are constantly being varied over a limited range by virtue of the random nature of the output from the noise generator 10. These phases control the opening and closing of the gate 18 by virtue of the fact that one output phase of the oscillator 12 is arranged to allow the gate 18 to be immune to signals over the pulse input lead 16, while the other output phase of the oscillator 12 controls gate 18 over gating input lead 14 to shunt clock pulse signals from clock circuit 20 to ground. When the gate 18 is immune to the signals over lead 16, the clock signal can pass over a normal route to random output terminal 22. On the other hand, this output terminal receives no signal when the gate 18 is controlled by the oscillator 12 to shunt signals from clock 20 to ground.

The probability that a given clock pulse signal from clock 20 will pass to the random output terminal 22 is controlled by the ratio of the oscillator "passing" phase to the sum of the "passing" and "shunting" oscillator phases, i.e., the total oscillator cycle. (This analysis assumed that the clock pulses from clock 20 are of short duration relative to even the shorter of the two oscillator output phases.) Thus, one possible illustrative operating mode is that the gate 18 is arranged to be immune to clock signals from clock 20 over lead 16 when the output of oscillator 12 is relatively negative ("passing" phase), and that the gate 18 will shunt clock pulse signals to ground when the output of the oscillator 12 is relatively positive ("shunting" phase). A typical output waveform for the oscillator 12 is shown in FIG. 3, with a modified square wave hearing a relatively negative phase of duration A and a relatively positive phase of duration B, the period P being equal to the sum of A and B. Following the above operating mode, the gate 18 will allow pulses from clock 20 to pass to output terminal 22 of the duration A of the illustrated waveform, while during the positive phase of duration B, the gate 18 will shunt any clock signals from clock 20 to ground. Therefore, the probability that a clock signal will proceed to the random output terminal 22 is the ratio of the interval A to the interval P for the illustrated oscillator output waveform.

The random nature of the control provided by the invention is illustrated when it is considered that there is a random relationship between the time that a clock pulse from clock circuit 20 is present on pulse input lead 16 to the gate 18 and the time when a passing phase of duration A from the oscillator 12 is present on gating input lead 14.

This random control is further illustrated by the fact that the random component of the output from the noise generator 10 is arranged to vary the frequency of the oscillator 12 over a relatively small range, for example ten percent, of the oscillator frequency. Thus, although the shunting phase interval B may be present by the circuit, the passing phase interval A may vary slightly over this range, thereby causing the cyclical period P to vary. However, over a relatively long period of time, the average frequency of the oscillator and therefore the period thereof remains approximately constant, thereby similarly establishing a relatively constant probability ratio A to P. Thus, the predetermined setting of the A to P probability is accurate, and yet assuming no correlation between the clock pulse source 20 and the occurrence of the respective phases of the oscillator 12 (this correlation is prevented by circuitry described more fully below), random output control is thereby insured.

That is, for a given oscillator cycle such as illustrated in FIG. 3, it cannot be said with any degree of certainty whether a pulse from clock source 20 will proceed un-diverted to random output terminal 22; all that can be stated definitely is that there is a probability of such undiverted passage, the probability being represented by the ratio A to P. (It is, of course, understood that the probability can be set in an empirical fashion by observing the output of the oscillator 12 on an oscilloscope, and thereby directly measuring the A to P ratio.)

A similar analysis is possible with respect to FIG. 1A, which shows the noise and clock circuitry combined in block 15.

*Detailed description*

The actual operation of the circuit may now be described with reference being made particularly to FIGS. 2 and 3. The noise generator 10 is illustrated as having a plurality of stages of amplification, only two of which are actually shown. The diode 32 is utilized as one possible source of randomly occurring "noise," and acts as the input to the amplifier-generator 10 by virtue of its connection to the base of transistor 30 which comprises the first stage of amplification. Each of the other stages of the noise generator 10 which are not actually shown in FIG. 2 can comprise similarly connected and biased transistors which generally conduct as long as they are appropriately biased.

The final amplified noise output is taken from the emitter follower stage of the amplifier comprising transistor 34. Depending upon the number of stages of amplification and the degree of noise provided by the diode 32, the amplitude of the noise output can be a relatively significant percentage of the bias voltage 36. For example, the amplitude of the noise taken from the emitter follower stage including transistor 34 may be approximately ten percent of the amplitude of source 36. This amplified noise output is coupled to the input to the oscillator 12 over connecting lead 38. As will be more fully seen below, the oscillator 12 is driven in part by this randomly varying noise output provided over lead 38.

The variable oscillator 12 is generally composed of two basic portions, the switching transistors 40 and 56 which together comprise a multivibrator or flip-flop circuit, and the unijunction transistors 46 and 62 and their accompanying components which control transistors 40 and 56 respectively. The unijunction transistors 46 and 62 operate so as to remain in a stable "off" state until the voltage at their base electrodes exceeds a predetermined value. At that time, a relatively high base current flows and thereby reduces the voltage at the base. This voltage drop is coupled back to one of the two multivibrator transistors 40 or 56 and as will be seen below, causes the coupled one of those transistors to turn off. This unijunction transistor timing controls the on-off multivibrator operation and in turn, can be said to control the alternate phase operation of the oscillator 12 provided to the gate 18 over gating lead 14.

The firing of unijunction transistor 46, which controls the state of multivibrator transistor 40, is controlled by an RC charging circuit including initial resistor 39, variable resistor 48, and charging capacitor 54. By varying the setting of resistor 48, the time constant associated with charging capacitor 54 can be adjusted. It is noted that the charging path for the RC circuit controlling unijunction transistor 46 is energized from the output of the noise generator 10 fed to the oscillator 12 over lead 38. On the other hand, since random control of both multivibrator transistors is not actually needed, the RC charging circuit associated with unijunction transistor 62 is a predetermined fixed circuit driven from biasing source 36 and including resistor 64 and charging capacitor 70. Of course, the values of resistor 64 and capacitor 70 can be modified so as to provide different firing times for unijunction transistor 62 as is desired, but for any given component values, the charging time for the RC circuit which fires unijunction transistor 62 is fixed.

The actual oscillator output is taken from lead 14 and transmitted to the gate 18. The phase relationship of the oscillator output as so transmitted depends upon the setting of switch arm 72, which can be set on terminal $P_1$ associated with the collector of multivibrator transistor 56, or on terminal $P_2$, associated with the collector of multivibrator transistor 40. In terms of the probability ratio previously described, transferring the arm 72 between terminals $P_1$ and $P_2$ has the effect of giving a probability relationship of A to P when terminal $P_2$ is in the circuit as shown, or (1 $A/P$) when terminal $P_1$ is in the circuit. This, more simply stated, allows for greater flexibility in selecting the preset probabilities, whereby a probablity of 0.25 can rapidly be switched to a probability of (1–0.25) or 0.75, for example.

A typical switching cycle of the oscillator 12 will now be described, assuming that at the beginning thereof, multivibrator transistor 40 is "on," while multivibrator transistor 56 is "off." Under these conditions, a charging path for charging capacitor 54 may be traced from the amplified noise output on lead 38 over a path including resistor 39, variable resistor 48, and through charging capacitor 54 to ground. Normally, as mentioned previously, unijunction transistor 46 is in a relatively off condition, whereby only a small current passes from source 36 through resistor 50 and the active electrode path of unijunction transistor 46 and via resistor 52 to ground.

However, when the charge on capacitor 54 builds to a point which exceeds the voltage threshold level of unijunction transistor 46 (although the charging time for capacitor 54 may be fixed as indicated above, nevertheless due to the varying amplitude of the noise output, the instantaneous time at which unijunction transistor 46 fires may vary within the limits previously described from cycle to cycle), unijunction transistor 46 turns on and a heavy current passes through its base and lower electrode path through resistor 52 to ground. The voltage at the base of unijunction transistor 46 thereby drops rapidly and the voltage drop is communicated back to multivibrator transistor 40 through a capacitor 44 and diode 42. This sharp voltage drop at the base of transistor 40 serves to turn this transistor off after a conduction period of duration A (FIG. 3). The de-energization of multivibrator transistor 40 causes its collector electrode to experience a sharp voltage rise from approximately ground to approximately the value of voltage source 36. This voltage rise is transmitted through a path including a parallel resistor-capacitor combination to the base of transistor 56 which now turns on.

The previously traced charging path for capacitor 54 is now shunted to approximately ground through the collector-emitter junction of transistor 56. However, a charging path for the other charging capacitor 70 can be traced from source 36 directly through resistor 64 to capacitor 70 which is grounded at its lower plate. This path exists regardless of the states of multivibrator transistors 40 and 56. It is also apparent that the time constant which controls the charging time for capacitor 70 is not under the influence of the randomly varying noise output, but instead is a function of the voltage source 36 and the component values of resistor 64 and capacitor 70. When the charge on capacitor 70 exceeds the base voltage rating of unijunction transistor 62, that transistor turns on and in so doing, draws a heavy current from the source 36 through resistor 64 and the base and lower electrode path of transistor 62 and via resistor 68 to ground. As with the energizing of unijunction transistor 46, the energization of unijunction transistor 62 causes a sharp decrease in voltage at its base, this decrease being transmitted back to the base of conducting multivibrator transistor 56 through coupling capacitor 60 and diode 58. This causes transistor 56 to turn off, the transistor having conducted for an interval of duration B (FIG. 3).

The voltage at the collector of transistor 56 thereupon rises from approximately ground to approximately the level of the noise source output on lead 38. This voltage rise is communicated through a parallel resistor-capacitor combination to the base of transistor 40 which thereupon turns on and commences the next oscillator cycle. The oscillator output voltage on lead 14 from terminal $P_2$ and arm 72 shows a drop at this time as the next interval A begins.

The gate 18, which is controlled over gating lead 14 by the various phases of the output from oscillator 12, is shown as comprising transistor 76 in an emitter-follower configuration, and diodes 74 and 78. Moreover, gate 18 is connected to the blocks of clock and pulse circuitry 20 over lead 16. Within the clock and pulse circuits 20, periodic signals are generated from the clock circuit 20A and are appropriately sharpened by pulse shaper 20B. (Pulse shaper 20B may be any one of a number of well-known shaping circuits, such as a Schmitt trigger circuit. Furthermore, it will be appreciated that the pulse shaper 20B may be dispensed with if the pulses from clock 20A are already appropriately shaped for a given application.) After emerging from the pulse shaper 20B, the periodic pulse has one of two paths to follow. When the gate 18 is off and in its "passing" state, the pulse will be transmitted directly to pulse amplifier 20C and thence to random output terminal 22. On the other hand, should gate 18 be on and thereby in its "shunting" state, the pulse will instead proceed from pulse shaper 20B over shunting lead 16, diode 78 and through the emitter-collector junction of transistor 76 to ground.

The state of gate 18 is controlled by the alternate phase outputs from the oscillator 12 over lead 14. Thus, transistor 76 will be off during the relatively negative interval of duration A and on during the relatively positive interval of duration B. It follows that for the duration A, the gate 18 is in its passing state since pulse shaper 20B is presented with no "diverting" path to ground. Any clock pulse will therefore pass to pulse amplifier 20C and after being amplified, to random output terminal 22. But when transistor 76 is on during interval B, gate 18 thereby being in its shunting state, any pulse appearing at lead 16 from pulse shaper 20B will be shunted to ground.

Thus, whether or not a pulse from the clock source 20A and the pulse shaper 20B will pass to the pulse amplifier 20C and random output terminal 22 is dependent upon the state of gate 18, which in turn is dependent upon the phase of the output from the oscillator 12. It can now be seen that the probability that a pulse generated by clock 20A will reach random output terminal 22 can be expressed as the ratio of the time durations of the passing phase and the period of the oscillator 12, or with respect to FIG. 3, the ratio A to P. With respect to any such pulse, this invention insures that one cannot definitely predict whether or not it will reach output terminal 22. This is due to the fact that the noise generator 10 is randomly varying the phase alternation of the waveform shown in FIG. 3, even though this is being done within relatively narrow limits. Nevertheless, the probability, taken over a number of cycles of the oscillator 12, that a pulse will reach output terminal 22 can still be represented with accuracy as the ratio A to P. Thus, a valuable compromise has been attained between the relatively accurate probability setting established by the ratio A to P (varied by variable resistor 48 in the oscillator 12), and the random nature of the gate 18. The ultimate result is the desired one: the presentation at output terminal 22 of pulse signals on a completely random time basis.

To maintain the random operation of the invention, it is important that there be no correlation between the clock pulses from clock 20A and the gating signal from the oscillator 12. This necessary isolation is provided by the gate 18, which prevents any clock pulses from finding their way to the circuitry associated with oscillator 12. Specifically, gate 18 acts as a buffer between any clock pulse on lead 16 and the oscillator 12 regardless of the state of transistor 76. Thus, when transistor 76 is off, gate 18 thereby being in its passing state, practically none of the pulse signals can get through the high off impedance of the emitter-base junction of transistor 76. And when transistor 76 is on and gate 18 is in the shunting state, any pulse leakage which might otherwise occur over the path including diode 78 and the emitter-base junction of transistor 76 is prevented from reaching lead 14 by the proper poling of diode 74.

It is to be understood that the above-described arrangements are illustrative of the application of the principles of the invention. Numerous other arrangements may be devised by those skilled in the art without departing from the spirit and scope of the invention.

What is claimed is:

1. A random output control circuit comprising pulsing means for generating a plurality of alternating phase signals and a plurality of periodic pulses, gating means responsive to a first phase of said plurality of alternating phase signals for passing said periodic pulses to an output terminal and responsive to a second phase of said plurality of alternating phase signals to prevent the passage of said periodic pulses to said output terminal; control means for randomly varying the output of said pulsing means, said pulsing means including an oscillator and a clock pulse source and means connecting said control means to said pulsing means for causing said control means to randomly vary the frequency of said oscillator; a voltage source, said control means including an amplifier and a source of noise impulses fed to said amplifier; said oscillator including a flip-flop circuit of at least two switching devices, and timing means for causing the switching of a first of said switching devices to be responsive to the output of said amplifier and the switching of a second of said switching devices to be responsive to said voltage source; said gating means including switching means for passing said periodic pulses when said first switching device is conducting and for blocking said periodic pulses when said second switching device is conducting; said timing means including first and second threshold elements the firing of which controls said first and second switching devices, a first RC timing circuit coupling said amplifier of said control means to said first threshold element, and a second RC timing circuit coupling said voltage source to said second threshold element.

2. A random output control circuit comprising pulsing means for venerating a plurality of alternating phase signals and a plurality of periodic pulses, gating means responsive to a first phase of said plurality of alternating phase signals for passing said periodic pulses to an output terminal and responsive to a second phase of said plurality of alternating phase signals to prevent the passage of said periodic pulses to said output terminal; control means for randomly varying the output of said pulsing means, said pulsing means including an oscillator and a clock pulse source and means connecting said control means to said pulsing means for causing said control means to randomly vary the frequency of said oscillator; a voltage source; said control means including an amplifier and a source of noise impulses fed to said amplifier; said oscillator including a flip-flop circuit of at least two switching devices, and timing means for causing the switching of a first of said switching devices to be responsive to the output of said amplifier and the switching of a second of said switching devices to be responsive to said voltage source; said gating means including switching means for passing said periodic pulses when said first switching device is conducting and for blocking said periodic pulses when said second switching device is conducting; including in addition a reference potential, said source of noise impulses including a diode, said first and said second switching devices including transistors, and said switching means of said gating means including a transistor for shunting said periodic pulses to said reference potential only when said oscillator is in said second phase and buffer means including said transistor in said switching means of said gating means for isolating said clock pulse source and said oscillator.

3. A random control circuit comprising a noise generator, an oscillator switchable between a first and a second condition including means for controlling the switching of said oscillator in response to said noise generator, pulse means for transmitting periodic pulses to an output terminal and gating means responsive to said first condition of said oscillator for preventing said pulses from reaching said output terminal, the probability that one of said periodic pulses will be transmitted to said output terminal being determined by the ratio of the duration of said second condition of said oscillator to the sum of the durations of said first and second conditions of said oscillator, said oscillator including means for varying said probability, including in addition switching means for changing said probability to the ratio of the duration of said first condition to said sum of said durations.

4. A random control circuit comprising a noise generator, an oscillator switchable between a first and a second condition including means for controlling the switching of said oscillator in response to said noise generator, pulse means for transmitting periodic pulses to an output terminal and gating means responsive to said first condition of said oscillator for preventing said pulses from reaching said output terminal, said pulse means including a clock circuit for generating periodic signals, a pulse shaper responsive to said periodic signals for developing said periodic pulses, and output means for transmitting amplified ones of said periodic pulses to said output terminal concurrent with said second condition of said oscillator.

5. A circuit in accordance with claim 4 wherein said gating means is connected to a reference potential and wherein said gating means includes a transistor for diverting said periodic pulses from said output means to said reference potential in response to said first condition of said oscillator.

References Cited

UNITED STATES PATENTS

| | | | |
|---|---|---|---|
| 2,607,896 | 8/1952 | Chambers | 328—59 XR |
| 2,767,315 | 10/1956 | Kosten | 331—78 |
| 3,049,676 | 8/1962 | Zinke | 331—78 |
| 3,250,923 | 5/1966 | Liska et al. | 307—247 |

ARTHUR GAUSS, *Primary Examiner.*

S. D. MILLER, *Assistant Examiner.*

U.S. Cl. X.R.

328—59; 307—247, 253, 240, 292, 293, 260, 269; 331—78